US005173954A

United States Patent [19]

Kato et al.

[11] Patent Number: 5,173,954

[45] Date of Patent: Dec. 22, 1992

[54] SPATIAL LIGHT MODULATION DEVICE AND IMAGE RECONSTRUCTING APPARATUS USING THE SAME

[75] Inventors: Makoto Kato; Yoshihiro Takiguchi, both of Shizuoka, Japan

[73] Assignee: Hamamatsu Photonics Kabushiki Kaisha, Shizuoka, Japan

[21] Appl. No.: 813,045

[22] Filed: Dec. 23, 1991

Related U.S. Application Data

[63] Continuation of Ser. No. 295,336, Jan. 10, 1989, abandoned.

[30] Foreign Application Priority Data

Jan. 14, 1988 [JP] Japan .................................. 63-5748

[51] Int. Cl.[5] .............................................. G06K 9/20

[52] U.S. Cl. ....................................... 382/65; 382/31; 359/245; 359/244; 359/242; 359/254

[58] Field of Search ............................ 382/31, 58, 65; 359/242, 245, 255, 244, 246

[56] References Cited

U.S. PATENT DOCUMENTS

| | | | |
|---|---|---|---|
| 4,618,217 | 10/1986 | Armitage | 350/393 |
| 4,818,983 | 4/1989 | Hara et al. | 350/345 |
| 4,830,472 | 5/1989 | Mukuozaka | 350/374 |
| 4,905,312 | 2/1990 | Mukouzaka | 350/374 |
| 4,908,702 | 3/1990 | Chao et al. | 382/31 |

FOREIGN PATENT DOCUMENTS

| | | |
|---|---|---|
| 2131165 | 6/1984 | United Kingdom . |
| 2161020 | 1/1986 | United Kingdom . |

OTHER PUBLICATIONS

Gilbert, P., "Iterative Methods for the Three-dimensional Reconstruction of an Object from Projections", J. Theor. Biol., vol. 36, pp. 105-117, (1972).

Shepp, L. A. et al., "Maximum Likelihood Reconstruction for Emission Tomography", IEEE Transactions on Medical Imaging, vol. MI-1, No. 2, pp. 113-122, Oct. 1982.

Hara, T. et al., "Microchannel Spatial Light Modulator Having the Functions of Image Zooming, Shifting, and Rotating", Applied Optics, vol. 25, No. 14, pp. 2306-2310, Jul. 15, 1986.

Zatz, L. M., "Basic Principles of Computed Tomography Scanning", General Theory of Computed Tomogrpahy, ch. 109, pp. 3853-3876.

Macovski, A., "Principles of Reconstruction Algorithms", General Theory of Computed Tomography, ch. 110, pp. 3877-3903.

*Primary Examiner*—Jose Couso

*Attorney, Agent, or Firm*—Finnegan, Henderson, Farabow, Garrett and Dunner

[57] ABSTRACT

A spatial light modulation device includes a spatial light modulation tube and converts a one-dimensional photoelectron image into a two-dimensional electron image, rotating the two-dimensional electron image, subjecting the rotated two-dimensional electron image and a previously stored electron image to addition or subtraction, and stores the electron image thus processed. An image reconstructing apparatus includes: projection means for detecting as projection data a projection of internal information of an object; the spatial light modulation device which produces and stores a corrected reconstructed image on the basis of a one-dimensional correction data image and a previously stored reconstructed image; optical reading means for reading out the reconstructed image form the spatial light modulation device; summing means for integrating parts of the readout reconstructed image to produce sum data; and comparison and correction means for subjecting the projection data and the sum data to comparison to form the one-dimensional correction data image.

8 Claims, 4 Drawing Sheets

SPATIAL LIGHT MODULATION DEVICE AND IMAGE RECONSTRUCTING APPARATUS USING THE SAME

This application is a continuation of application Ser. No. 07/295,336 filed Jan. 10, 1989 now abandoned.

BACKGROUND OF THE INVENTION

This invention relates to a spatial light modulation device used for an image processing operation in a tomographic apparatus, and to an image reconstructing apparatus using the spatial light modulation device.

Heretofore, in the field of image processing, images are, in general, digitally processed by using a computer system. One application of such an image processing technique is an image reconstructing apparatus as shown in FIG. 6, which is used in a tomographic apparatus.

In the image reconstructing apparatus as shown in FIG. 6, a ray source 80 applies, for instance, X-rays to an object 81 under examination, and a measuring instrument 82 detects a dose of X-rays passed through the object. The dose of X-rays thus detected is a projection datum produced by adding internal information of the object in the direction of irradiation and projecting the added result. The projection datum is converted into a digital value by an A/D (analog-to-digital) converter 83, which is provided to a comparator 84. In the image reconstructing apparatus, an image memory 85 is used to store a reconstructed image. A reconstructed image has picture elements the number of which corresponds to the number of internal information of the object. The data f(i,j) of the picture elements are summed in the direction corresponding to the direction of irradiation of the object 81, and provided to the comparator 84. At the beginning, the data f(i,j) of the picture elements have suitable initial values. In the comparator 84, the projection datum is compared with the sum of the data f(i,j) of the picture elements taken in the direction of irradiation to obtain the difference value therebetween. The difference value is provided to a computer system 86. In the computer system 86, the difference values are subjected to a prescribed digital operation to produce correction data. The correction data are laid over the data f(i,j) of picture elements to correct the data f(i,j) so that the difference between each internal information of the object 81 and the corresponding datum f(i,j) of picture element may be decreased.

Thereafter, either the ray source 80 or the object 81 is rotated by a predetermined angle $\omega$, and according to the projection data which are obtained with the changed direction of irradiation and the reconstructed image, the above-described operations are carried out again. In this manner, the reconstructed image is sequentially renewed; that is, the image processing operations are carried out until the difference between the reconstructed image and the internal information of the object is less than a predetermined threshold difference.

The above-described image reconstructing method, being disclosed in the literature "Iwanami Lectures, Information Science—21, (Pattern Recognition and Figure Processing)", pp. 192 to 195 published on Mar. 10, 1983, is well known as an iterative approximation method in the field of image processing.

In the image reconstructing apparatus according to the conventional iterative approximation method, the image processing operation is electrically carried out;

that is, the operation of comparing the projection data with the sum data of reconstructed image, the operation of processing the difference values resulted from the comparison to obtain the correction data, and the operation of laying the correction data over the reconstructed image to correct the latter are digitally carried out.

However, the above-described method of digitally processing images suffers from difficulties that image cannot be improved in accuracy and in resolution without increasing the number of picture elements, and the image processing operation takes a long time. In addition, rotating a picture element matrix in a digital calculation is considerably difficult in the points of memory capacity and processing time, thus being unsuitable for realtime processing of image.

In other words, when, in the image reconstructing apparatus, it is required to perform the operations of adding/subtracting and rotating with respect to the reconstructed image in a digital calculation, the accuracy and the resolution of the reconstructed image cannot be improved without greatly increasing the amount of hardware, and the image processing time is considerably long.

SUMMARY OF THE INVENTION

Accordingly, an object of this invention is to provide a novel spatial light modulation device in which image processing operations can be carried out in parallel and in an analog mode, and an image reconstructing apparatus with this spatial light modulation device which can readily provide a reconstructed image, high in accuracy, in a short time and is suitable for realtime processing.

The foregoing object of the invention has been achieved by the provision of:

a spatial light modulation device which, according to the invention, comprises: conversion means for converting a one-dimensional photoelectron image into a two-dimensional electron image; rotating means for rotating the two-dimensional electron image; adding-/subtracting means for subjecting the two-dimensional electron image thus rotated and an electron image stored previously to addition or subtraction; and storing means for storing the electron image thus processed, and an image reconstructing apparatus which, according to the invention, comprises: projection means for detecting as projection data a projection in a direction of irradiation of initial information of an object under examination; a spatial light modulation device which converts a one-dimensional correction data image into a two-dimensional correction function image, rotates the two-dimensional correction function image, then subjects the rotated image and a reconstructed image previously stored to addition or subtraction to correct the reconstructed image, and stores the reconstructed image thus corrected; optical reading means for reading the reconstructed image of the spatial light modulation device; summing means for integrating parts of the reconstructed image thus read out in the direction corresponding to the direction of irradiation of the projection means to produce sum data; and comparison and correction means for subjecting the projection data and sum data to comparison to form a reconstructed-image-correcting one-dimensional correction data image.

In the spatial light modulation device of the invention, a one-dimensional photoelectron image is converted into a two-dimensional electron image, the two-dimensional electron image is rotated, the two-dimensional electron image thus rotated and an electron image previously stored are subjected to addition or subtraction to correct the latter electron image, and the electron image thus corrected is stored. The spatial light modulation device includes a spatial light modulation tube in which the operation of converting the one-dimensional electron image into the two-dimensional electron image, the operation of rotating the two-dimensional electron image, and the operation of subjecting the two-dimensional electron image and the electron image previously stored to addition or subtraction are carried out in parallel and in an analog mode. Therefore, with the spatial light modulation device, image processing operations can be achieved at high speed with high accuracy and with high resolution.

In the image reconstructing apparatus of the invention, when the projection means detects projection data in a predetermined direction of irradiation, the reconstructed image optically read out by the reading means is summed in the direction corresponding to the direction of irradiation of the projection means by the summing means. The projection data and the sum data in the predetermined direction of irradiation are subjected to comparison to obtain, for instance, the difference therebetween. The difference is normalized by dividing it, for instance, by a distance between a ray source and a measuring instrument to form a one-dimensional correction data image. The one-dimensional correction data image is applied to the above-described spatial light modulation device, where it is converted into a two-dimensional correction function image, the two-dimensional correction function image is rotated so as to correspond to the direction of irradiation, and the two-dimensional correction function image thus rotated and the reconstructed image previously stored therein are subjected to addition or subtraction to correct the latter reconstructed image, to thereby decrease the difference between the reconstructed image and the internal information of an object under examination. Thereafter, the direction of irradiation of the projection means is slightly rotated, and in association with this, the reconstructed image summing direction of the summing means is rotated; and under this condition the one-dimensional correction data image is formed. The one-dimensional correction data image is applied to the spatial light modulation device, where it is converted into the correction function image. The correction function image is rotated by an angle corresponding to the rotation of the direction of irradiation and laid over the reconstructed image which has been stored therein. That is, with the direction of irradiation gradually rotated, the reconstructed image stored in the spatial light modulation device is successively corrected to approximate the internal information of the object under examination.

Other and further objects, features and advantages of the invention will appear more fully from the following description taken in connection with the accompanying drawings.

DETAILED DESCRIPTION OF THE PREFERRED EMBODIMENTS

Preferred embodiments of the present invention will be described with reference to the accompanying drawings.

Figure 1:
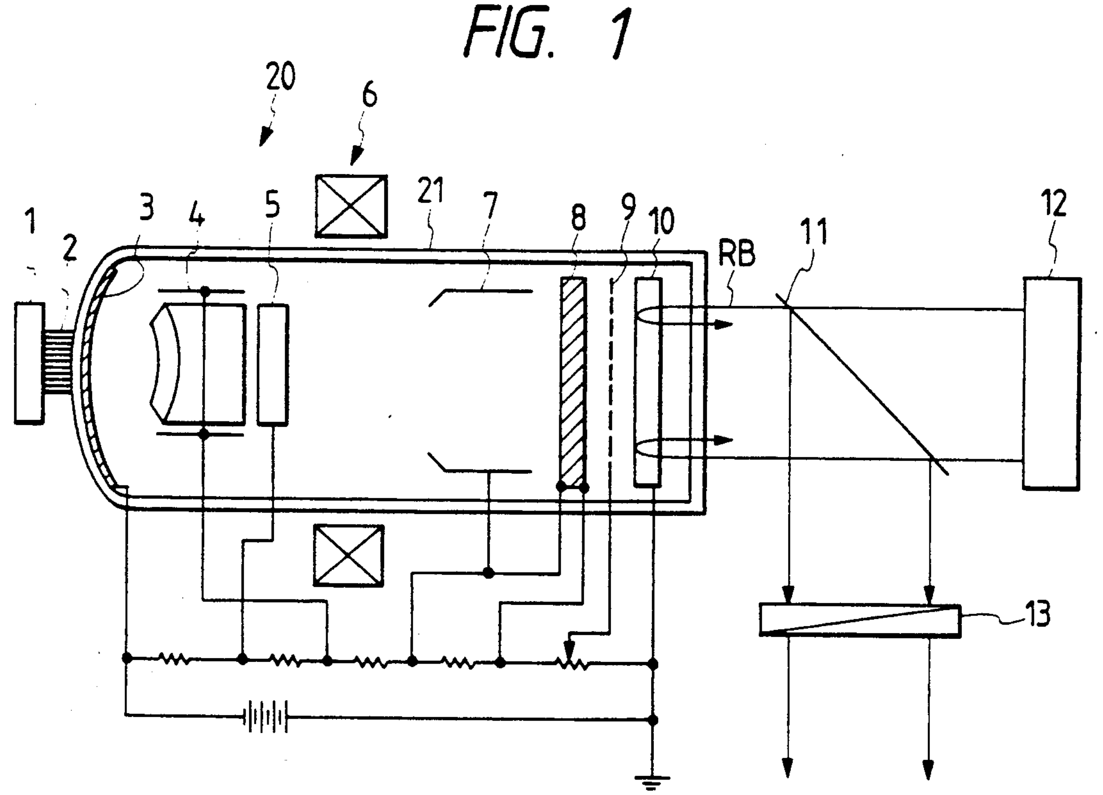
FIG. 1 is an explanatory diagram showing the arrangement of a spatial light modulation device according to an embodiment of the present invention.

FIG. 1 is an explanatory diagram showing the arrangement of a spatial light modulation device according to an embodiment of the invention. The spatial light modulation device 20 shown in FIG. 1 is so designed that the output light of a one-dimensional light-emitting element array 1 is one-dimensionally image-formed on a photocathode 3 of a spatial light modulation tube 21 by means of an image-forming optical system 2. The spatial light modulation tube 21 comprises: the photocathode 3; a cylindrical electron lens system 4 for expanding the one-dimensional electron image which is a result of photoelectric conversion by the photocathode 3 into a two-dimensional electron image; a collimating electrode 5; an electron image rotating system 6 for rotating an electron image; a focusing electrodes 7; a multiplying section 8 for multiplying an electron image; a mesh electrode 9 for controlling the speed of the electron image thus multiplied; and an electro-optic crystal 10.

The one-dimensional light-emitting element array 1 is, for instance, a light-emitting diode array arranged one-dimensionally. The image-forming optical system 2 is, for instance, a fiber plate.

The cylindrical electron lens system 4 in the spatial light modulation tube 21 comprises an electrostatic lens or electromagnetic lens. The electron image rotating system comprises an electromagnetic lens. The multiplying section 8 employs a microchannel plate.

Figure 2:
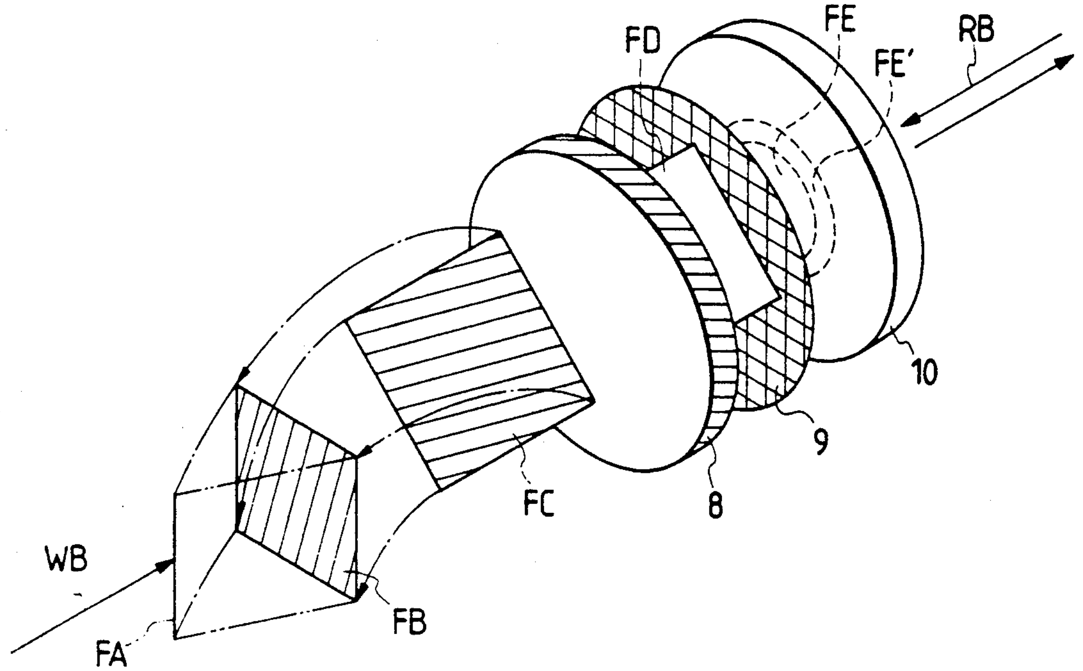
FIG. 2 is an explanatory diagram for explaining an image processing operation of the spatial light modulation device shown in FIG. 1.

As shown in FIG. 2, in the spatial light modulation device 20 thus constructed, the output light of the one-dimensional light-emitting element array 1 is image-formed, as a writing light beam WB, on the photocathode 3 by means of the image-forming optical system 2, so that it is subjected to the photoelectric conversion; that is, it is converted into the one-dimensional electron image FA. The electron image FA is expanded into the two-dimensional electron image by means of the cylindrical electron lens system 4. The two-dimensional electron image FB is collimated by the collimating electrode 5, and is rotated by a predetermined angle by applying a predetermined electric signal to the electron image rotating system 6 so as to form an electron image FC as indicated in FIG. 2. The electron image FC is multiplied by the multiplying section 8 to form an electron image FD, and is provided through the mesh electrode 9 to the electro-optic crystal 10, where it is laid over an electron image FE which has been stored in the electro-optic crystal 10, as a result of which the electron image FE is corrected into an electron image FE'.

In this operation, a voltage applied to the mesh electrode 9 is externally controlled so that the addition or subtraction operation with respect to the electron image FD which has been multiplied by the multiplying section 8 and the electron image FE which has been stored in the electro-optic crystal 10 is directly carried out, as a result of which the corrected electron image FE' is obtained and stored in the electro-optic crystal 10. The electron image thus stored changes the refractive index distribution of the electro-optic crystal 10. For instance, when a parallel light source 12 applies a reading light beam RB having a predetermined polarization component through a half-mirror 11 to the electro-optic crystal 10, the latter 10 changes the polarization of the reading light beam RB and reflects the light beam RB. The reading light beam RB thus reflected is provided through the half-mirror 11 to an analyzer 13, where a light intensity variation is extracted. Thus, the light intensity variation of the reading light beam RB thus extracted is reflective of the electron image stored in the electro-optic crystal 10.

As was described above, in the spatial light modulation tube 21 of the spatial light modulation device 20 of the invention, the operation of converting the one-dimensional writing light beam WB into the two-dimensional electron image, the operation of rotating the two-dimensional electron image by the predetermined angle, the operation of subjecting the electron image thus rotated to addition or subtraction with the electron image stored in the electro-optic crystal, and the operation of outputting the corrected electron image as the optical image, are all performed in parallel. Therefore, if the spatial light modulation device of the invention is applied to image processing, it can be achieved quickly with a considerably simple system, when compared with the conventional image processing which is digitally carried out by using an image memory and so forth. In addition, in the invention, the image processing operations are carried out in an analog mode with the spatial light modulation device, and therefore, the resultant image is considerably high both in accuracy and in resolution.

Figure 3:
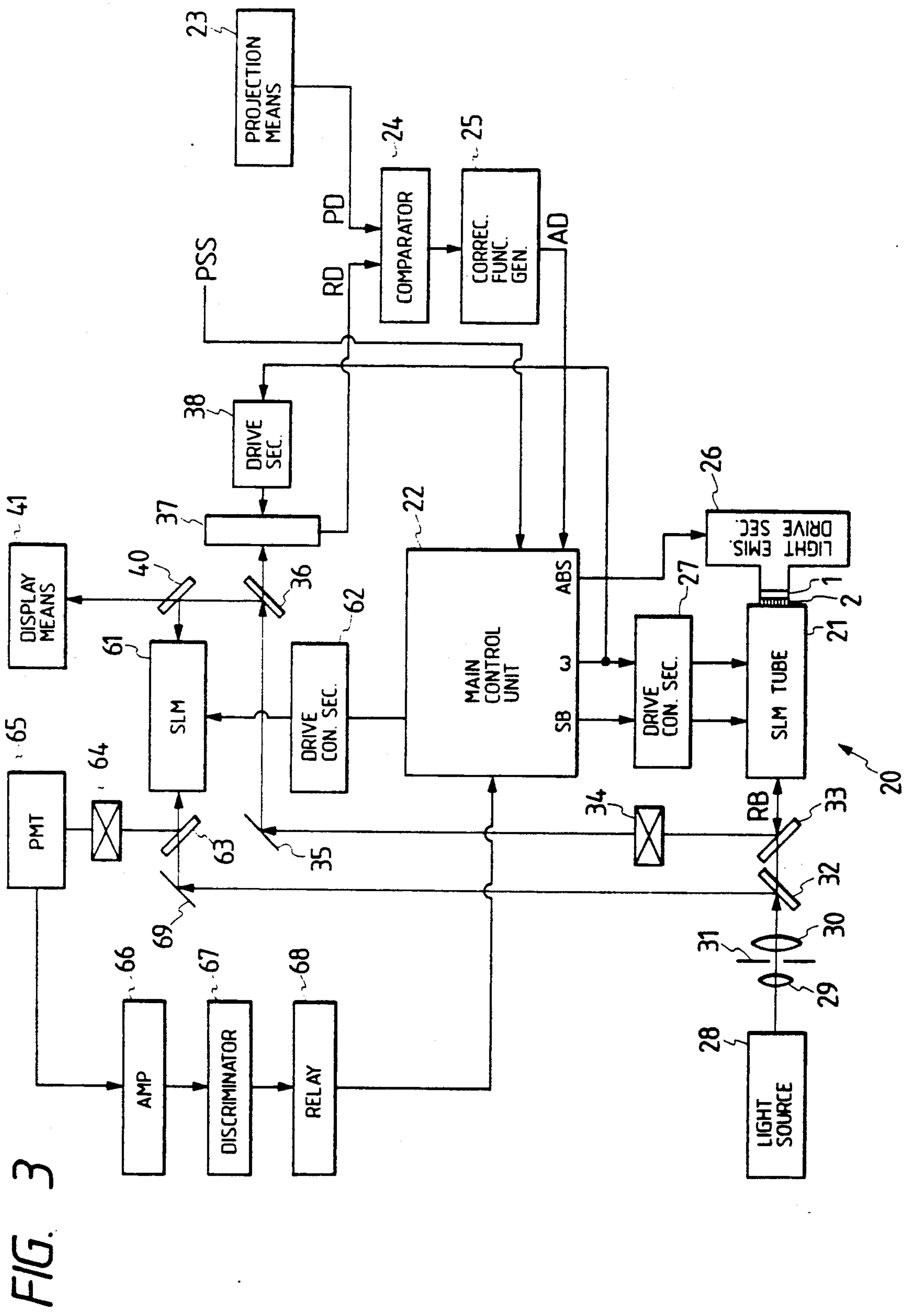
FIG. 3 is an explanatory diagram, partly as a block diagram, showing an image reconstructing apparatus of the invention with the spatial light modulation device illustrated in FIG. 1.

FIG. 3 is an explanatory diagram, partly as a block diagram, showing the arrangement of an image reconstruction apparatus according to an embodiment of the invention, which employs the spatial light modulation device as shown in FIG. 1.

The image reconstructing apparatus is so designed that its image reconstructing operations by the iterative approximation method as described before can be optically carried out with the spatial light modulation device 20 as shown in FIG. 1; that is, the operations are performed in an analog mode. More specifically, in the image reconstructing apparatus, a reconstructed image is stored in the electro-optic crystal 10 in the spatial light modulation tube 21 of the spatial light modulation device 20, and a correction function image is laid over the reconstructed image, thereby performing iterative approximation of the reconstructed image. In this operation, in the spatial light modulation tube 21, an operation of converting a one-dimensional correction data image into a two-dimensional correction function image, an operation of rotating the two-dimensional correction function image, and an operation of subjecting the correction function image thus rotated to addition or subtraction with the reconstructed image are carried out in an analog mode and in a parallel manner.

Figure 4:
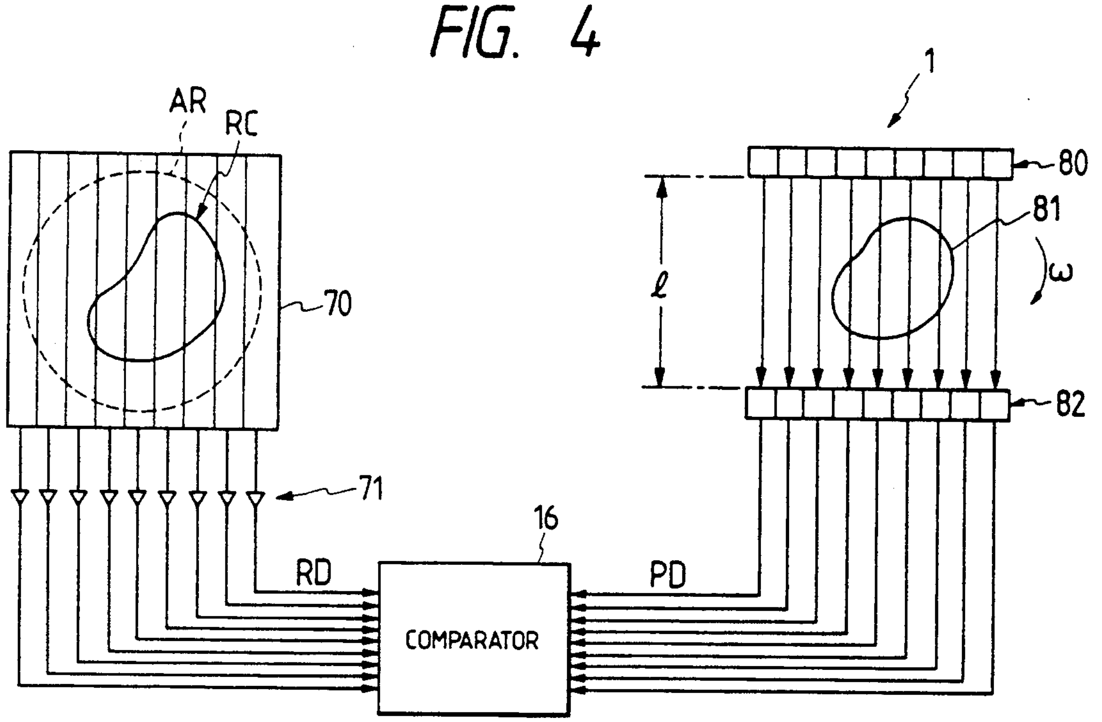
FIG. 4 is an explanatory diagram showing examples of projection means and of light intensity detecting unit in the image reconstructing apparatus shown in FIG. 3.

In the image reconstructing apparatus of FIG. 3, the total image reconstructing operations are controlled by a main control unit 22. In projecting means 23, as shown in FIG. 4, a ray source 80 which emits X-rays, gamma rays, or the like is spaced by a predetermined distance l from a measuring instrument 82, so that the doses which have passed through an object 81 under examination are detected with the measuring instrument 82, and the internal information of the object 81 is projected in the direction of irradiation so as to be outputted as projection data PD. The projection data PD have analog values, and are provided to a comparator 24. The projection datum PD may be an electrical signal or optical signal.

A projection start signal PSS is provided to the main control unit 22. In response to the projection start signal PSS, the main control unit 22 starts the image reconstructing operations, and recognizes the direction of irradiation of the projection with which direction the data are to be inputted to the comparator 24. That is, in response to the projection start signal PSS, computing operations are performed in synchronization with the input of the projection data PD, so that the image reconstruction is carried out in realtime.

In the comparator 24, upon start of the image reconstructing operations, the projection data PD from the object and sum data RD provided from an optical intensity detecting unit 37 (described later) are subjected to comparison, and the difference values (RD - PD) therebetween are obtained. The difference values (RD - PD) are provided to a correction function generator 25. The correction function generator 25 is so designed as to provide as a correction data the values obtained by dividing the difference values (RD - PD) by the distance l between the ray source 80 and the measuring instrument 82 in the projection means 23.

The main control unit 22 divides the correction data AD into absolute value data ABS and positive or negative sign datum SB, and evaluates these data to provide instructions to a light emission drive section 26 and to a drive control section 27, respectively. On the other hand, the main control unit 22 provides according to the projection start signal PSS an angle datum $\omega$ which indicates the direction of irradiation to the drive control section 27.

The light emission drive section 26 latches the absolute value data ABS of the correction data AD, and according to the data ABS, drives the one-dimensional light emitting element array 1 in the spatial light modulation device 20 shown in FIG. 1 with predetermined timing, so that the one-dimensional light emitting element array 1 outputs a one-dimensional correction data image. The one-dimensional correction data image is applied through the image-forming optical system 2 to the spatial light modulation tube 21. The one-dimensional correction data image is subjected to the photoelectric conversion by the photocathode 3 of the spatial light modulation tube 21 and is then expanded to a two-dimensional correction function image by means of the cylindrical electron lens system 4. The drive control section 27 provides prescribed respective control signals to the electron image rotating system 6 and the mesh electrode 9 in the spatial light modulation tube 20 on the basis of the angle datum $\omega$ and the sign datum SB provided from the main control unit 22. When the control signal corresponding to the angle datum $\omega$ is provided to the electron image rotating system 6, the correction function image which has been expanded by the cylindrical electron lens system 4 is rotated so as to correspond to the direction of irradiation of the projecting means 23, thus becoming a proper correction function image. When the control signal corresponding to the sign datum SB is provided to the mesh electrode 9, in accordance with the potential of the mesh electrode 9, the proper correction function image and the reconstructed image which has been previously stored in the electro-optic crystal 10 are subjected to addition or subtraction; that is, the image sum or difference thereof is obtained, so that the reconstructed image is subjected to an iterative correction. The reconstructed image is stored as an electric charge image in the electro-optic crystal 10; that is, as a refractive index distribution of the electro-optic crystal 10.

The reconstructed image stored in the spatial light modulation tube 21 is read out with the light beam from a light source 28. The light source 28 may be a HeNe laser which outputs a linearly polarized light beam. The linearly polarized light beam from the light source 28 is converted into a parallel coherent light beam about 20 mm in diameter by means of lenses 29 and 30 and an aperture member 31. The parallel coherent light beam is applied, as a reading light beam RB, to the spatial light modulation tube 21 through half-mirrors 32 and 33. The polarization of the reading light beam RB is changed by the refractive index distribution of the electro-optic crystal 10, and the reading light beam reflected from the crystal 10 is provided through the half-mirror 33 to an analyzer 34. The analyzer 34 extracts the light intensity distribution of a predetermined polarization component out of the reading light beam RB, to output the reconstructed image in the form of the light intensity distribution. The reading light beam RB from the analyzer 34; that is, the reconstructed image is provided through a mirror 35 and a half-mirror 36 to the light intensity detecting unit 37.

The light intensity detecting unit 37 may comprise a movable slit and light intensity detector (such as photomultiplier tube) in combination, or an array detector (such as a silicon strip detector S2458 manufactured by Hamamatsu Photonics Kabushiki Kaisha) and an integrator in combination. FIG. 4 shows the range AR (about 20 mm in diameter) of the reading light beam which has been made incident on the array detector 70 and the reconstructed image RC in the case where the light intensity detecting unit 37 is made up of the array detector 70 and the integrator 71. The light intensity detecting unit 37 is controlled by a drive section 38. The drive section 38 comprises, for instance, a motor control section and a motor to rotate the light intensity detecting unit 37 by a predetermined angle according to the angle datum ω which is provided from the main control unit 22 and indicates the direction of irradiation. That is, in the case where the light intensity detecting unit 37 comprises the movable slit and the light intensity detector, in order to obtain the sum of light intensities in the direction corresponding to the direction of irradiation of the projecting means 23 the drive section 38 rotates the movable slit in the direction corresponding to the direction of irradiation, so that the light intensity detector detects all the output light beams from the movable slit. On the other hand, in the case where the array detector 70 and the integrator 71 are used in combination as shown in FIG. 4, the drive section 38 rotates the array detector 70 in the direction corresponding to the direction of irradiation, and the integrator 71 integrates the output, in the form of a electric charge, of the array detector 70 one-dimensionally in the direction of irradiation.

In FIG. 3, display means 41 is to display the reconstructed image which is provided thereto through the mirror 35 and the half-mirror 36. The display means 41 may be an image memory for merely storing the reconstructed image (such as an electrical memory, photographing means or hologram), or a screen, display unit or printer which can display it as a visible image.

The image reconstructing apparatus shown in FIG. 3 has judging/ending means which judges whether or not the reconstructed image satisfactorily approximates the internal information of the object under examination, and when it is determined that the reconstructed image satisfactorily approximates the internal information of the object, terminates the reconstructing operations. The judging/ending means comprises: a spatial light modulator 61; a drive control section 62; a half-mirror 63; and an analyzer 64; a photomultiplier tube 65; an amplifier 66; a discriminator 67; and a relay 68.

The spatial light modulator 61, unlike the spatial light modulation tube 21, may not have an image rotating function.

The reconstructed image provided from the analyzer 34 is applied through the mirror 35 and the half-mirrors 36 and 40 to the spatial light modulator 61, into which it is written. In the spatial light modulator 61, the reconstructed image thus stored is compared with the reconstructed image which has been previously stored therein to obtain the difference therebetween. The image difference thus obtained is read out with the reading light beam applied through the half-mirror 32, the mirror 69 and the half-mirror 63. The image difference thus read out is provided through the half-mirror 63 and the analyzer 64 to the photomultiplier tube 65 and detected thereby. The output of the photomultiplier tube 65 is provided to the amplifier 66. The output of the amplifier 66 is provided to the discriminator 67, where it is judged whether or not the output of the amplifier 66 is lower than a predetermined threshold difference. When it is lower than the predetermined threshold difference, it is determined that the reconstructed image has satisfactorily approximated the internal information of the object under examination. Hence, the relay 68 is driven so that the operation of the main control unit 22 may be suspended to terminate the image reconstructing operations.

Figure 5:
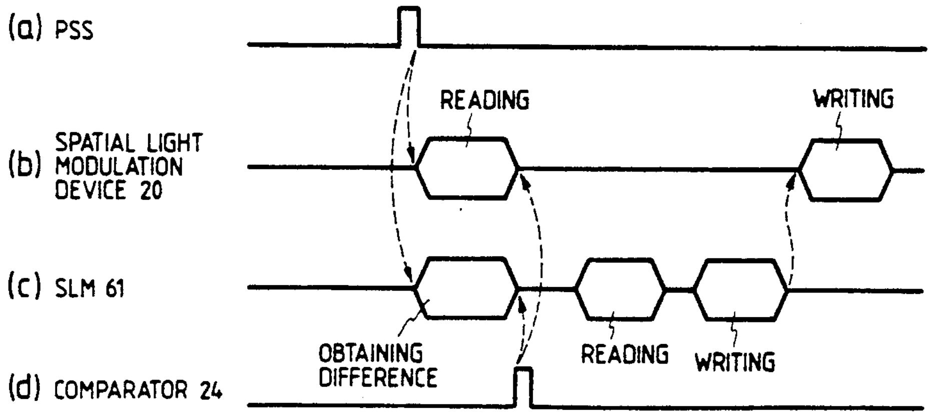
FIGS. 5(*a*) through 5(*d*) are time charts for explaining an operating procedure of the image reconstructing apparatus of FIG. 3.
Figure 6:
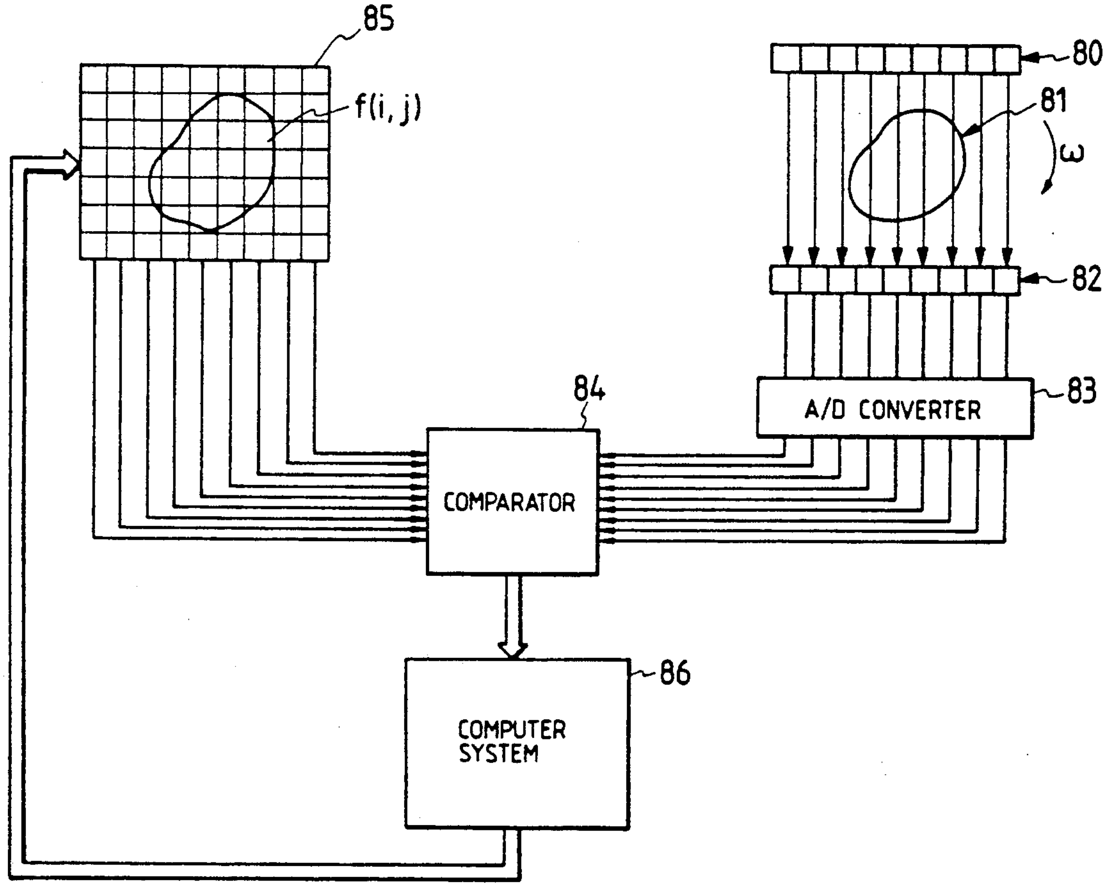
FIG. 6 PRIOR ART
FIG. 6 is an explanatory diagram showing the arrangement of a conventional image reconstructing apparatus.

The image reconstructing operations will be described with reference to time charts shown in FIG. 5.

First, initial conditions are given to the image reconstructing apparatus as follows: Optional initial values are stored in the spatial light modulation tube 21 (for instance, nothing is stored therein), the spatial light modulator 61 is placed, for instance, in the state that nothing is stored therein, and the angle datum ω of the main control unit 22 is set to an initial value. Under this condition, as shown in FIG. 5(*a*), the projection start signal PSS is inputted to the main control unit 22 in synchronization with the projection data PD. In response to the signal PSS, the main control unit 22 provides the angle datum ω to the drive control section 27. In synchronization with the projection start signal PSS, the reconstructed image is read out of the spatial light modulation device 20 as shown in FIG. 5(*b*), while in the spatial light modulator 61 in the judging/ending means the reconstructed image thus read out is compared with the reconstructed image which has been previously stored therein to obtain the image difference as shown in FIG. 5(c).

The reconstructed image read out of the spatial light modulation tube 20 is applied to the light intensity detecting unit 37. In the unit 37, parts of the one-dimensional image extended in the direction corresponding to the direction of irradiation of the projecting means 1 are cut out of the reconstructed image, and the sum of the optical intensities thereof is obtained. The sums of the light intensities are provided, as sum data RD, to the comparator 24. In the first reading operation of the spatial light modulation tube 20, the reconstructed image of the optional initial values present therein are read out.

The comparator 24 operates with the timing as shown in FIG. 5(d) when both the sum data RD and the projection data PD are outputted, to subject those data RD and PD to comparison to thereby obtain the difference (RD - PD) therebetween. The difference (RD - PD) is applied to the correction function generator 25, which outputs the correction data AD.

The correction data AD are provided to the main control unit 22, where the data AD are divided into the absolute value data ABS and the sign datum SB, which are therein subjected to evaluation. The sign datum SB is supplied to the drive control section 27, while the absolute value data ABS are supplied to the light emission drive section 26, where the data ABS are latched. Thereafter, the operation of reading out the result of difference operation out of the spatial light modulator 61 is started as shown in FIG. 5(c). In this operation, it is judged by the discriminator 67 whether or not the difference operation result is lower than the predetermined threshold difference. When the difference operation result is lower than the predetermined threshold difference, it is determined that the reconstructed image satisfactorily approximates the internal information of the object under examination and the operation is ended. When the difference operation result is not lower than the threshold difference, the iterative approximation is carried out again. For this purpose, the reconstructed image is read out of the spatial light modulation tube 21 and is written into the spatial light modulator 61 as shown in FIG. 5(c).

Thereafter, for the purpose of correcting the reconstructed image which has been stored in the spatial light modulation tube 21, the absolute value data ABS of the correction data AD latched in the light emission drive section 26 is used to cause the one-dimensional light emitting element array to output the one-dimensional correction data image, which is written into the spatial light modulation device 20. In writing the one-dimensional correction data image into the spatial light modulation device 20, i.e., into the spatial light modulation tube 21, the one-dimensional correction data image is subjected to the photoelectric conversion by the photocathode 3 of the spatial light modulation tube 21 and converted into the two-dimensional correction function image by the cylindrical electron lens system 4. The two-dimensional correction function image is then rotated according to the angle datum provided from the drive control section 27, thus being converted into a proper correction function image. In accordance with the potential of the mesh electrode 9 which is based on the sign datum SB, the proper correction function image and the reconstructed image which has been previously stored into are subjected to addition or subtraction, so that the reconstructed image is corrected.

Thus, one operation cycle has been accomplished. The next operation cycle is started when the next projection start signal PSS is provided to the main control unit 22. In the next cycle, the direction of irradiation of the projection means 23 is slightly rotated. The main control unit 22 detects the rotation angle from the projection start signal PSS, produce angle datum ω, and controls both the angle of rotation of the correction function image and the angle of rotation in the light intensity detecting unit 14 according to the angle datum ω thus produced, to thereby repeat the above-described operations.

The reconstructed image is iteratively approximated in the above-described manner, to approximate the internal information of the object under examination. The reconstructed image thus processed is displayed on the display means so that the internal information of the object can be observed.

As was described above, in the spatial light modulation device 20, the fundamental image processing operations; that is, the operation of converting the one-dimensional correction data image into the two-dimensional correction function image, the operation of rotating the correction function image, and the operation of subjecting the correction function image and the previously stored reconstructed image to addition or subtraction, are carried out in an analog mode and in a parallel manner. Therefore, the image reconstructing device of the invention is free from the above-described problem of memory capacity, and can readily obtain the reconstructed image which is high both in accuracy and in resolution, thus being suitable for realtime processing.

In the above-described embodiment, in the correction function generator 25, the difference values (RD - PD) provided from the comparator 24 are divided by the distance l, to output the correction data AD; however, the correction function generator 25 may be so modified that the division is carried out with the difference values (RD - PD) weighted as required.

As was described above, in the spatial light modulation device of the invention, the image conversion, the image rotation and the image addition or subtraction are carried out in an analog mode and in a parallel manner. Therefore, the image processing operations can be quickly achieved with high accuracy and with high resolution, although the amount of hardware is relatively little. Furthermore, the image reconstructing apparatus of the invention employs the spatial light modulation device of the invention to optically perform the image reconstructing operations in an analog mode, and therefore it can readily and quickly obtain the reconstructed image high both in accuracy and in resolution in realtime with the reduced amount of hardware.

What is claimed is:

1. A spatial light modulation device, comprising:

means for supplying a one-dimensional photoelectron image;

conversion means for converting said one-dimensional photoelectron image into a two-dimensional electron image, said conversion means including a cylindrical electron lens system for expanding each point of said one-dimensional photoelectron image along an axis transverse to the one dimension;

rotating means for rotating said two-dimensional electron image;

storing means for storing electron images;

means for subjecting a rotated two-dimensional electron image and an electron image stored in the storing means to one of addition and subtraction; and means for updating, in the storing means, the electron image that has been subjected to said one of addition and subtraction.

2. The spatial light modulating device as claimed in claim 1, wherein said rotating means includes an electromagnetic lens.

3. The spatial light modulating device as claimed in claim 1, further comprising a microchannel plate for amplifying said rotated two-dimensional electron image.

4. The spatial light modulating device as claimed in claim 1, wherein said subjecting means includes a mesh electrode, said one of addition and subtraction being performed according to a predetermined voltage of said mesh electrode.

5. The spatial light modulating device as claimed in claim 1, wherein said storing means includes an electrooptic crystal for storing said one of added and subtracted electron image in a form an electric charge image.

6. The spatial light modulating device as claimed in claim 1, further comprising a lens system for image-forming one-dimensional light beams on a photocathode of said spatial light modulation device.

7. The spatial light modulating device as claimed in claim 1, wherein said supplying means includes a linear array of light-emitting elements.

8. The spatial light modulating device as claimed in claim 1, further comprising collimating means for collimating said two-dimensional electron image.

* * * * *